United States Patent
Alford et al.

(10) Patent No.: US 7,279,137 B2
(45) Date of Patent: Oct. 9, 2007

(54) BURNERS AND COMBUSTION APPARATUS FOR CARBON NANOMATERIAL PRODUCTION

(75) Inventors: J. Michael Alford, Lakewood, CO (US); Michael D. Diener, Denver, CO (US); James Nabity, Arvada, CO (US); Michael Karpuk, Boulder, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 350 days.

(21) Appl. No.: 10/098,829

(22) Filed: Mar. 15, 2002

(65) Prior Publication Data

US 2003/0044342 A1    Mar. 6, 2003

Related U.S. Application Data

(60) Provisional application No. 60/316,426, filed on Aug. 30, 2001.

(51) Int. Cl.
*B01J 12/00* (2006.01)
*F23D 3/40* (2006.01)
*F23D 14/12* (2006.01)

(52) U.S. Cl. .................... 422/129; 422/150; 431/2; 431/7; 431/328

(58) Field of Classification Search ............ 423/445 B, 423/445 R, 449.1, 447.3; 431/326, 328, 431/7, 121, 122, 157, 170, 2; 432/179, 205; 422/129, 150

See application file for complete search history.

(56) References Cited

U.S. PATENT DOCUMENTS 2,618,533 A * 11/1952 Bills et al. ................. 23/209.8

(Continued)

FOREIGN PATENT DOCUMENTS

| JP | 6056414 A2 | 3/1994 |
|---|---|---|
| JP | 7138009 A2 | 5/1995 |
| WO | PCT 2002227838 | 3/2003 |

OTHER PUBLICATIONS

Merriam-Webster Online Dictionary, http://.m-w.com/dictionary/refractory.*

(Continued)

*Primary Examiner*—Wayne A. Langel
*Assistant Examiner*—James Fiorito
(74) *Attorney, Agent, or Firm*—Greenlee, Winner and Sullivan, P.C.

(57) ABSTRACT

The invention provides improved burners, combustion apparatus, and methods for carbon nanomaterial production. The burners of the invention provide sooting flames of fuel and oxidizing gases. The condensable products of combustion produced by the burners of this invention produce carbon nanomaterials including without limitation, soot, fullerenic soot, and fullerenes. The burners of the invention do not require premixing of the fuel and oxidizing gases and are suitable for use with low vapor pressure fuels such as those containing substantial amounts of polyaromatic hydrocarbons. The burners of the invention can operate with a hot (e.g., uncooled) burner surface and require little, if any, cooling or other forms of heat sinking. The burners of the invention comprise one or more refractory elements forming the outlet of the burner at which a flame can be established. The burners of the invention provide for improved flame stability, can be employed with a wider range of fuel/oxidizer (e.g., air) ratios and a wider range of gas velocities, and are generally more efficient than burners using water-cooled metal burner plates. The burners of the invention can also be operated to reduce the formation of undesirable soot deposits on the burner and on surfaces downstream of the burner.

28 Claims, 4 Drawing Sheets

U.S. PATENT DOCUMENTS

| | | | | |
|---|---|---|---|---|
| 3,217,701 A * | 11/1965 | Weiss | | 126/92 |
| 3,739,557 A | 6/1973 | Anderson et al. | | 55/302 |
| 3,810,732 A * | 5/1974 | Koch | | 431/7 |
| 3,912,443 A * | 10/1975 | Ravault et al. | | 431/328 |
| 3,954,388 A | 5/1976 | Hildebrand | | 431/329 |
| 3,955,947 A | 5/1976 | Hoon et al. | | 55/300 |
| 4,082,523 A | 4/1978 | Pausch | | 55/293 |
| 4,202,660 A * | 5/1980 | Pei | | 431/328 |
| 4,250,145 A * | 2/1981 | Pobst, Jr. et al. | | 422/151 |
| 4,259,095 A | 3/1981 | Johnson, Jr. | | 55/302 |
| 4,329,162 A | 5/1982 | Pitcher, Jr. | | 55/523 |
| 4,500,283 A | 2/1985 | Smith | | 431/328 |
| 4,608,012 A | 8/1986 | Cooper | | 431/328 |
| 4,673,349 A | 6/1987 | Abe et al. | | 431/328 |
| 4,889,481 A | 12/1989 | Morris et al. | | 431/328 |
| 5,227,038 A | 7/1993 | Smalley et al. | | 204/173 |
| 5,273,729 A | 12/1993 | Howard et al. | | 423/445 |
| 5,304,366 A | 4/1994 | Lorents et al. | | 423/445 B |
| 5,316,636 A | 5/1994 | Bunshah et al. | | 204/157.47 |
| 5,364,182 A * | 11/1994 | Hawkins | | 366/25 |
| 5,395,409 A | 3/1995 | Klimczak et al. | | 55/302 |
| 5,409,375 A * | 4/1995 | Butcher | | 431/328 |
| 5,470,222 A | 11/1995 | Holowczack et al. | | 431/7 |
| 5,800,580 A | 9/1998 | Feldt | | 55/378 |
| 5,837,017 A | 11/1998 | Santschi et al. | | 55/302 |
| 5,876,684 A | 3/1999 | Withers et al. | | 423/445 B |
| 5,985,232 A * | 11/1999 | Howard et al. | | 423/447.3 |
| 6,162,411 A | 12/2000 | Howard et al. | | 423/445 B |
| 6,244,860 B1 * | 6/2001 | Gross et al. | | 432/219 |
| 6,423,331 B1 * | 7/2002 | Mangold et al. | | 424/421 |
| 6,725,811 B1 * | 4/2004 | Moore et al. | | 122/13.01 |
| 2002/0104596 A1 * | 8/2002 | Crafton et al. | | 148/538 |
| 2005/0147552 A1 | 7/2005 | Howard | | |

OTHER PUBLICATIONS

Bachmann et al. (1994), "The formation of $C_{60}$ and its precursors in naphthalene flames," Chem. Phys. Lett. 223:506-510.

Bogdanov, A.A. et al. (May 2000), "Development Prospects of the Commercial Production of Fullerenes," Tech. Phys. 45(5):521-527.

Curl et al. (Oct. 1991), "Fullerenes," Sci. Am. pp. 54-63.

Diederich et al. (1991), "The Higher Fullerenes: Isolation and Characterization of $C_{76}$, $C_{84}$, $C_{90}$, $C_{94}$, and $C_{70}O$, an Oxide of $D_{5h}$-$C_{70}$," Science 252:548-551.

Diener, M.D. et al. (Sep. 2000—web published), "Synthesis of Single-Walled Carbon Nanotubes in Flames," J. Phys. Chem. B 104:9615-9620.

Hebgen P and Howard, J.B. (1999), "Synthesis of Fullerenes in Low Pressure Benzene/Oxygen Diffusion Flames," Fifth Int'l Microgravity Combustion Workshop K.R. Sachsteder and J.S. T'ien (eds.) NASA/CP 1999-208917, pp. 137-140.

Homann, K.-H. (1998), "Fullerenes and Soot Formation—New Pathways to Large Particles in Flames," Angew, Chem. Int. Ed. 37:2434-2451.

Howard et al. (1991), "Fullerenes $C_{60}$ and $C_{70}$ in flames," Nature 352:139-141.

Howard et al. (1992), "Production of $C_{60}$ and $C_{70}$ Fullerenes in Benzene-Oxygen Flames," J. Phys. Chem. 96:6657-6662.

Howard et al. (1992), "Fullerenes Synthesis in Combustion," Carbon 30:1183-1201.

Krätschmer et al. (1990), "Solid $C_{60}$: a new form of carbon," Nature 347:354-358.

McKinnon et al. (1992), "Combustion Synthesis of Fullerenes," Comb. Flame 88:102-112.

Taylor et al. (1993), "Formation of $C_{60}$ by pyrolysis of naphthalene," Nature 366:728-731.

Zhang et al. (1999), "Laser Ablation Mass Spectrometry of Pyrolyzed Koppers Coal-Tar Pitch: A Precursor for Fullerenes and Metallofullerenes," J. Phys. Chem. B 103:9450-9458.

Alford, J.M., Diener, M.D., Wright, J.D., "Large-scale production of fullerenes by combustion," Book of abstracts, Paper 175, 215th ACS national meeting, Dallas, Mar. 29-Apr. 21, 1998.

* cited by examiner

BURNERS AND COMBUSTION APPARATUS FOR CARBON NANOMATERIAL PRODUCTION

CROSS-REFERENCE TO RELATED APPLICATIONS

This application takes priority from U.S. provisional Patent Application No. 60/316,426 filed Aug. 30, 2001, which is hereby incorporated by reference herein to the extent not inconsistent with the disclosure.

STATEMENT REGARDING FEDERALLY SPONSORED RESEARCH OR DEVELOPMENT

This invention was made with government support from the U.S. Department of Energy under SBIR grant number DE-FG03-98ER82692. The United States government has certain rights in this invention.

BACKGROUND OF THE INVENTION

The invention relates to carbon nanomaterial production in sooting flames, in particular burners, combustion apparatus, and methods for carbon nanomaterial production.

The term "carbon nanomaterials" is used generally herein to refer to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, fullerenes, single-walled carbon nanotubes (SWNTs), multiple-walled carbon nanotubes (MWNTs), nanotubules, and nested carbon structures with dimensions on the order of nanometers. The term "fullerene" is used generally herein to refer to any closed cage carbon compound containing both six-and five-member carbon rings independent of size and is intended to include the abundant lower molecular weight $C_{60}$ and $C_{70}$ fullerenes, larger known fullerenes including $C_{76}$, $C_{78}$, $C_{84}$ and higher molecular weight fullerenes $C_{2N}$ where N is 50 or more. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term fullerenic soot is used in the art to refer to soot containing fullerenes. Fullerenic soot is encompassed by the term carbon nanomaterials.

Different carbon nanomaterials have different potential applications. Fullerenes and fullerenic soot have potential applications as additives to electron- and photo-resists for semiconductor processing; for use in proton-conducting membranes for fuel cells, optical limiting materials and devices, and lithium battery anodes; as active elements in organic transistors; as pigments in cosmetics; as antioxidants; and as therapeutics, e.g., as anti-viral agents. While the art recognizes significant potential for commercial application of carbon nanomaterials, the high cost and difficulty in obtaining these materials in the large amounts necessary for developing these applications has been a major impediment in practical application of these materials.

Sooting flames are the most cost-effective way to produce carbon nanomaterials at large production rates (greater than roughly 100 g/day). Fullerene synthesis in premixed flames stabilized on a water-cooled flat metal plate, where the plate forms the outlet for the gases and the surface of the burner, is known to the art. (Howard et al., U.S. Pat. No. 5,273,729). This kind of burner was developed for combustion research studies, not for materials production. However, burners with water-cooled surfaces work only over a relatively narrow range of operating parameters. Also, burners with water-cooled surfaces sink a large portion of the heat generated by burning the hydrocarbon into the cooling water, rather than using the heat in the fullerene-forming reactions. Further, use of a cooled burner surface results in increased deposit formation on the burner surface, causing irregularities in gas flow, leading to inhomogeneities in the flame, and adversely affecting the material production yield and homogeneity. Eventually, the burner surface becomes coated, and the synthetic process must be stopped to clean the burner.

An uncooled burner surface which can be operated at higher temperatures has several advantages for fullerene production. The rate of buildup of fullerene deposits on the burner surface is dramatically reduced, because the deposits are more readily volatilized or burned off. As a result, the uncooled burners require cleaning less often, if ever. It is also more efficient to operate an uncooled burner, because the heat load on the burner can heat the gas flow, raising the flame temperature. The chemical energy released by combustion is used more efficiently rather than being lost to the cooling water. With an uncooled burner surface, combustion is anchored right at the surface, making it more difficult to blow out the flame as gas velocities are increased, significantly increasing flame stability. Thus, the increased flame stability that results from the use of the uncooled burner allows for higher throughput. Another advantage of an uncooled burner surface is the ability to introduce low vapor pressure additives into the flame as gases, without condensing on the cool burner plate surface. One example of such additives are high-boiling polycyclic aromatic hydrocarbon (PAH)-rich feedstocks that serve as cost-effective, high-yield feeds for fullerene production. PAHs are aromatic hydrocarbon molecules containing two or more six-membered rings, two or more five-membered rings or a mixture of one or more five- and one or more six-membered rings. Other examples are catalysts that sublime at elevated temperatures, easing their incorporation into the feed stream.

Burners with high temperature (uncooled) surfaces have been used for applications other than carbon nanomaterial synthesis such as industrial furnaces. For example, Abe et al., U.S. Pat. No. 4,673,349 describe a high temperature surface combustion burner having a porous ceramic body. In both embodiments of the invention reported, the porous ceramic body contains throughholes. U.S. Pat. No. 4,889,481 to Morris et al. reported a dual structure porous ceramic burner for use as an infrared heat source. U.S. Pat. No. 5,470,222 to Holowczack et al. reported a high emissivity porous ceramic flame holder for use in a heating unit.

It is, however, known in the art that special fuels and combustion conditions are required for production of substantial amounts of fullerenes. During normal or industrial combustion the formation of fullerenes is so low that these materials can only be detected with the most sensitive analytical techniques (K.-H. Homann, Angew. Chem. Int. Ed. 1998, 37, 2434-2451). Burner design is one of the variables that must be optimized to provide efficiency and an acceptable rate of fullerene production (A. A. Bogdanov et al, Technical Physics, Vol. 45, No. 5, 2000, pp. 521-527). Many of the conditions required for high fullerene yields by combustion are extremely unusual, and the combination of conditions is unique. In contrast to burners that are used for heat generation or propulsion, burners used for fullerene synthesis produce copious quantities of solid carbon product. Further, highly aromatic fuels instead of hydrocarbon gases such as alkanes, are the optimum feeds for fullerene production and the feedstock is preferably burned in oxygen rather than air. Another unique aspect of fullerene production by combustion is that the burner is preferably operated at sub-atmospheric pressure. Implicit in the use of low pressures is low Reynolds number (typically less than 100) burner operation, in contrast to high Reynolds number operation (typically in the thousands) for burners used in other applications. Low Reynolds number operation implies extremely laminar flow and mixing of gases solely by molecular diffusion. A burner intended for fullerene production should be designed for optimal performance under these unique operating conditions.

There is a need for improved methods and apparatus, including burners, for making carbon nanomaterials, including fullerenes, in sooting flames which can lower the cost of production and provide these materials in sufficient quantities for practical application.

BRIEF SUMMARY OF THE INVENTION

The invention provides improved burners, combustion apparatus, and methods for carbon nanomaterial production. The burners of the invention provide sooting flames of fuel and oxidizing gases. The condensable products of combustion produced by the burners of this invention contain carbon nanomaterials including without limitation, soot, fullerenic soot, and fullerenes. The burners of the invention do not require premixing of the fuel and oxidizing gas and are suitable for use with low vapor pressure fuels such as those containing substantial amounts of polyaromatic hydrocarbons. The burners of the invention can operate with a hot burner surface and require little, if any, cooling or other forms of heat sinking. The burners of the invention provide for improved flame stability, can be employed with a wider range of oxidizer (e.g., air)/fuel ratios and a wider range of gas velocities, and are generally more efficient than burners using water-cooled metal burner plates. The burners of the invention can also be operated to reduce the formation of undesirable soot deposits on the burner and on surfaces downstream of the burner. Upstream and downstream are defined with respect to the overall direction of fuel and oxidizer flow through the burner.

The invention provides a burner for carbon nanomaterial production in which the outlet of the burner is formed from porous refractory material. The porous refractory material functions to stablize the flame at or near the outlet surface of the burner, to provide a thermal shield preventing flame propagation back into the burner plenum, and to provide for preheating of the fuel and oxidizing gases prior to combustion. Suitable types of porous refractory material include reticulated plates, particulate (grog), bundled narrow diameter tubes, and cellular ceramics with aligned flow passages, such as those used for catalyst supports, diesel engine exhaust gas particulate filters and molten metal filters. Cellular ceramics, sometimes referred to as "honeycomb filters," as described in U.S. Pat. No. 4,329,162, are produced in many different sizes and shapes, and are commercially available.

The burner plenum is optionally heated or cooled, e.g., via a fluid jacket, to control the temperature of the fuel and oxidizing gases within the plenum. For example, fuel condensation within the plenum can be prevented by heating the plenum. Prevention of fuel condensation within the plenum is particularly important when fuels such as low vapor pressure PAH-rich feedstocks are employed. The burner plenum also optionally contains a gas mixing region upstream of the refractory material in order to improve mixing of the fuel and oxidizing gases prior to their passage into the refractory part of the burner.

The combustion apparatus of the invention incorporates one or more burners of the invention and can be employed to generate higher levels of fullerenes in soot produced in combustion. The combustion apparatus of this invention further comprises a reaction zone, a zone of the apparatus downstream of the burner where temperatures are preferably maintained between about 1000° C. and about 1600° C. Condensation of combustion products to form carbon nanomaterials can occur or continue in the reaction zone. In a specific embodiment, a portion of the combustion apparatus downstream of the burner is insulated to better retain heat from the burner and to thereby maintain temperatures in the zone at levels that promote continued reaction to generate carbon nanomaterials. Insulation of a portion of the combustion apparatus downstream of the burner functions to elongate the reaction zone which functions to enhance the yield of carbon nanomaterials.

The combustion apparatus is provided with a collection apparatus (a collector) for collecting synthesized carbon nanomaterials. The collection apparatus can simply be one or more surfaces of the combustion apparatus upon which products condense for collection (e.g., by manual or automated scraping of the surfaces). Alternatively and preferably, the collection apparatus comprises a filtering device for capturing carbon nanomaterials which may contain one or more filters and a mechanism for releasing the captured products from the filter(s). For example, access can be provided into the combustion apparatus for release of products from the filter. Alternatively, when more than one filter is employed an apparatus for removing a filter from the flow of product gas can be provided to allow cleaning of the filter. Alternatively and preferably, an apparatus for in situ release of collected products from a filter can be provided.

The combustion apparatus is provided with a suitable pumping system to facilitate gas flow from the burner through the reaction zone and collection apparatus to a system exhaust. The pumping system provides for reduced pressure (sub-atmospheric pressures) in the reaction zone.

In a preferred embodiment, additional oxidizing gas is supplied into the combustion apparatus along the walls of the apparatus and is preferably provided along the circumference of the porous refractory portion of the burner. The additional oxidizing gas decreases the formation of soot deposits on the porous refractory material and on surfaces at the periphery of the reaction zone downstream of the burner.

The combustion apparatus of the invention can also optionally be provided with a chamber for volatilizing fuel. The volatilizing chamber allows for heating and/or pressurization of fuels to insure that they are volatilized prior to passage into the burner. This volatilization chamber is particularly useful with low volatility fuels such as those containing substantial amounts of PAHs.

The invention also provides methods for making carbon nanomaterials employing the burners of this invention and the combustion apparatus of this invention.

DETAILED DESCRIPTION OF THE INVENTION

The invention provides a burner for carbon nanomaterial production having at least one porous refractory element at the outlet of the burner plenum. The element may, for example, be a unitary porous element, such as a porous plate, through which gas flow passes, or it may be composed of a volume of non-porous refractory particles, such as grog, through which gas flow passes. If multiple refractory plates or a plurality of grog particles are used at the burner outlet, the plates or particles can have different compositions and/or porosity characteristics. The burner of the invention provides sooting flames of fuel and oxidizing gases. The condensable products of combustion produced by the burners can contain carbon nanomaterials.

Figure 1:
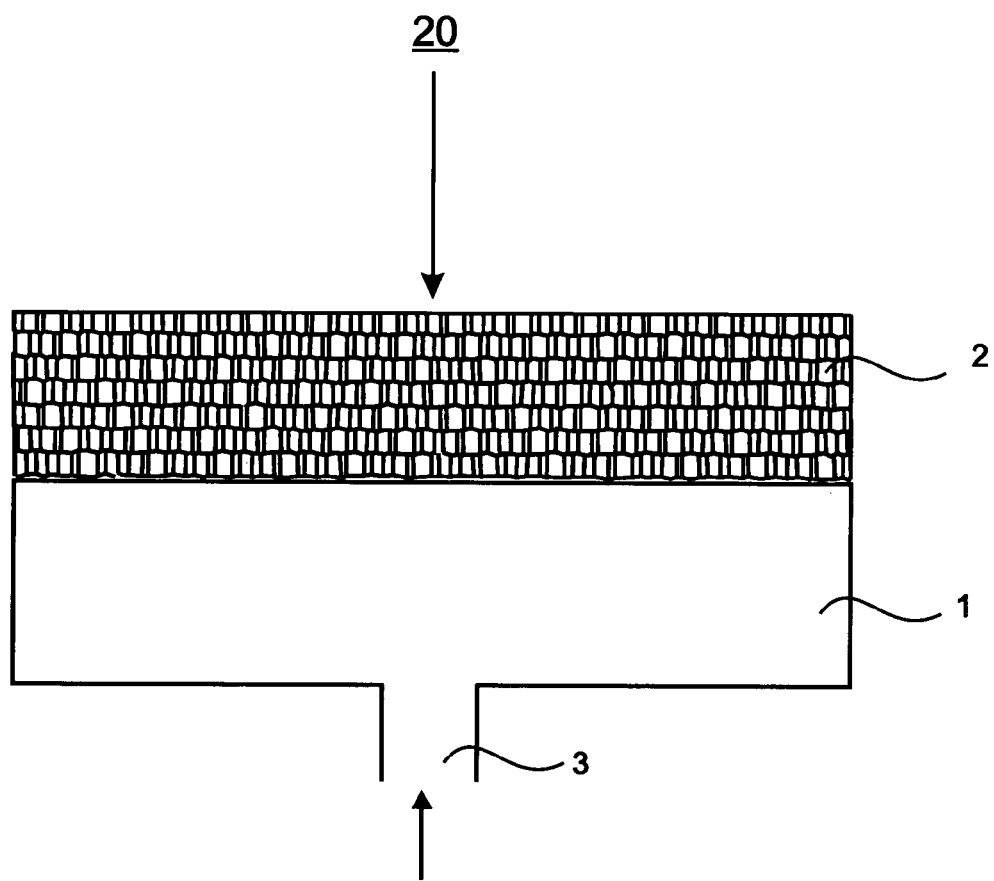
FIG. 1 is schematic illustration of a burner of the invention.

FIG. 1 illustrates one burner embodiment (20) comprising a plenum (1) having at least one gas inlet (3) for admitting a fuel gas and an oxidizing gas to the burner, and at least one porous refractory element (2) forming the outlet for the fuel and oxidizing gas from the burner. The attachment of the porous refractory element to the burner plenum varies according to the type of refractory element. A porous refractory plate is preferably attached to the plenum by a seal in order to maximize gas flow through the refractory plate and minimize blow-by. Preferably the seal is an elastomeric seal, such as room temperature vulcanized silicone (RTV) to provide for efficient durable sealing. Alternatively, gaskets, suitable adhesives or ceramic sealants can be employed. In the embodiment shown in FIG. 1, the fuel and oxidizing gases would typically be supplied to the gas inlet (3) premixed.

The porous refractory element can also be composed of particulate refractory material, such as grog. In this case, refractory particles are retained and supported within a holder which is sufficiently porous to allow gas flow passage, but retain the particulate refractory material. For example, a porous metal frit can be employed in the holder to support particulate refractory material.

When a metal frit is used in the holder, sufficient particulate refractory must be used to insulate the frit below temperatures where it anneals. If a metal frit is used, it can be welded or sealed (e.g. with an elastomer or epoxy) to the plenum.

The refractory material may also be cellular in nature. In this case, it can be sealed to the plenum with elastomer, epoxy, ceramic sealant, or by forming other similar seals.

Although FIG. 1 illustrates a burner with vertically upflowing gases, other burner orientations, such as those having gases vertically downflowing or flowing horizontally, can be employed if appropriate support for the porous refractory element is provided. In particular, if the burner is oriented so that the porous refractory element is below the plenum, gravitational effects will help to reduce soot deposition on the porous refractory element during combustion. Particulate refractory materials are not preferred for forming the burner surface for downflowing burner configurations.

A heating or cooling device, e.g., fluid jacket (FIG. 2, 10) optionally surrounds the plenum in order to control the temperature of the fuel and oxidizing gases within the plenum. For example, it may be advantageous to heat the plenum to prevent condensation of the fuel within the plenum. Prevention of fuel condensation within the plenum is important particularly for low vapor pressure fuel such as those fuels that are PAH-rich feedstocks. Depending on the amount of heat transmitted into the plenum by the refractory burner element, it may also be advantageous to cool the plenum to maintain the temperature of the gases below their decomposition temperature or to allow use of an elastomeric seal between the porous refractory burner plate and the plenum. Fluids suitable for use in a heating/cooling fluid jacket include water and propylene glycol. Other means for heating the plenum (electrical heaters) or for cooling the plenum (refrigertion devices, electrical coolers) can also be employed if desired.

Figure 2:
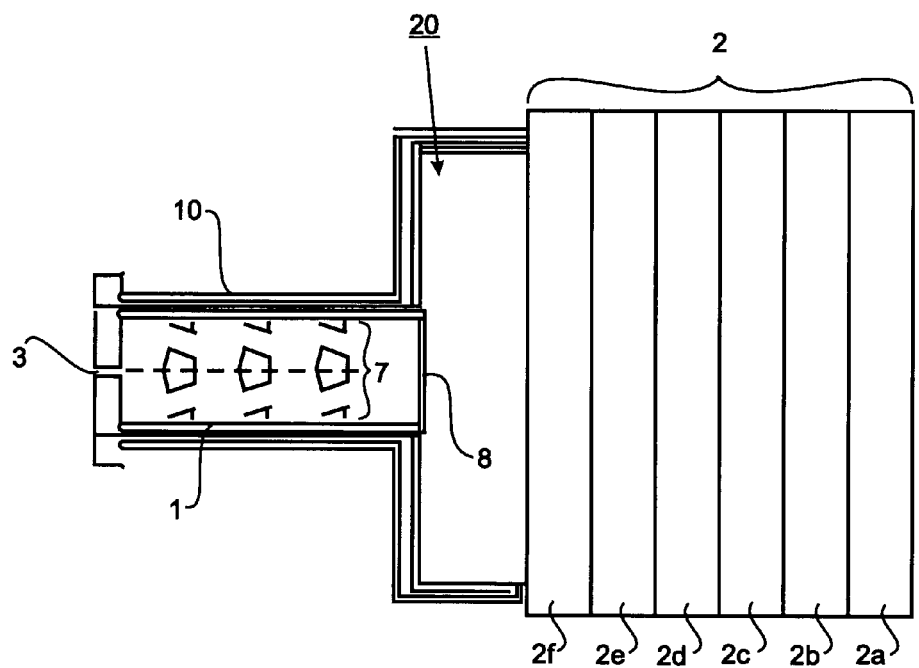
FIG. 2 shows another burner embodiment.

FIG. 2 schematically shows another burner embodiment (20) illustrating the use of a fluid jacket (10) surrounding the plenum (1) walls. This burner embodiment employs a stack of six porous refractory plates (2*a*-*f*).

In a vertically upflowing burner, the top plate can be replaced by a volume of particulate refractory. The advantage of the particulate refractory is that, unlike a plate, the particulate cannot crack under thermal stress. Alternately, all plates can be replaced by a particulate refractory on top of a porous frit (vide infra) or a single porous refractory plate. Tube bundles and cellular ceramics can also be used to form the refractory element. The refractory element or elements employed, no matter how formed, should provide a sufficient thermal gradient between the downstream surface and the plenum so as to prevent ignition of the premixed gases in the plenum. Those of skill in the art will appreciate the equivalency of various layered combinations of the different types of porous refractory material. When particulate refractory materials are used, pores are formed substantially between the particles. Porosity of the refractory element in such cases can be adjusted by varying the particle size employed.

Figure 3:
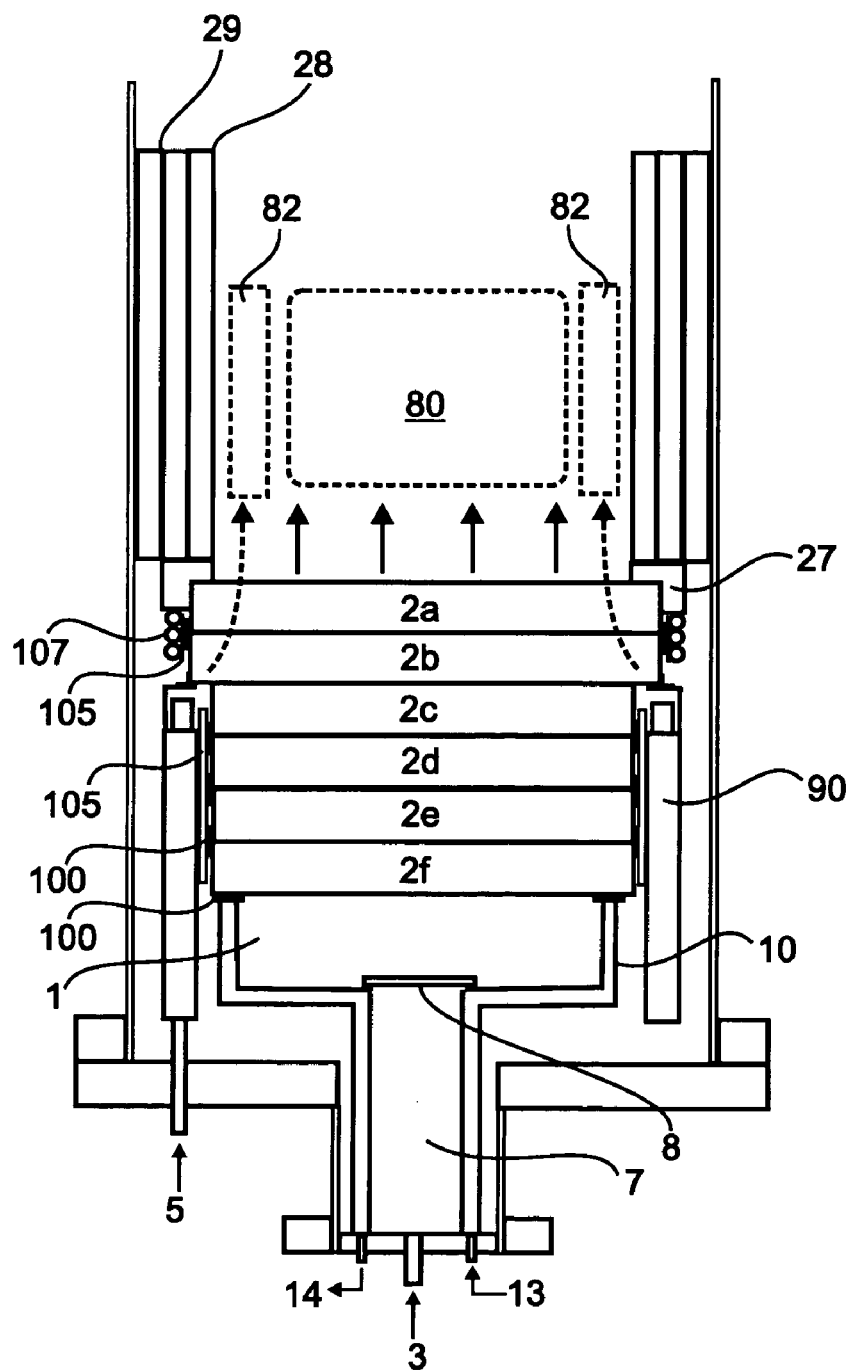
FIG. 3 shows a cross-sectional view of a burner inside an exemplary combustion apparatus.

The seals at the joints between the refractory elements and between the plenum and the refractory elements are not shown in FIG. 2, but similar seals are illustrated in FIG. 3 and discussed below. FIG. 2 also illustrates the use of additional mixing devices (7, 8) within the plenum, also as described in more detail below. Further, the burner of FIG. 2 illustrates horizontal operation of a burner in a combustion system.

The fuel and oxidizing gases can be supplied premixed to the burner of FIG. 2, as shown in FIG. 1, or mixing can occur within the burner. In particular, the burner plenum optionally contains a static mixer (7) upstream of the refractory element in order to mix the fuel and oxidizing gases prior to their flow through the refractory element, as schematically illustrated in FIG. 2. The static mixer in the plenum can be combined with the fluid jacket around the plenum to better control the temperature at which the mixing of the fuel and oxidizing gases occurs. Static mixers suitable for use with the invention are known to the art and are commercially available, for example from Koflo, Inc. (Cary, Ill.). Some mixing can also be achieved by introducing baffles or other protrusions into the conduit leading to the plenum or into the plenum itself. The plenum provides an area expansion of the gases from the feed connection, which is usually much smaller than the burner diameter, to the upstream side of the porous refractory element. Thus, given a slight pressure drop (tens of torr) across the porous refractory element, the plenum acts to distribute the gas flow more evenly across the porous refractory element. The radial shape of the plenum is therefore most preferably the same radial shape of the porous refractory element. The axial length and shape of the plenum does not typically affect burner performance except that it is preferred to limit the length of the plenum to avoid difficulties in igniting the flame and to conserve space in the reaction chamber.

A porous metal plate, such as those available from Mott Corp. (Farmingham. Conn.) placed upstream of the porous refractory plate can also facilitate mixing of the fuel and oxidizing gases. The porous metal plate can have a pore size typical of porous metal plates used in gas diffusion mixers, which is of the order of 1-100 microns. Such a porous metal plate (8) is also schematically illustrated in FIG. 2. In addition, passage of the fuel and oxidizing gases through the porous refractory element (plates, particulates or combinations thereof) can further provide for some additional mixing by molecular diffusion.

In a preferred embodiment, additional oxiding gas (or oxidizer) is provided to flow along the walls of the combustion apparatus. In a specific embodiment, this additional oxidizing gas can be provided at the periphery of the top porous refractory element. The additional oxidizing gas decreases the formation of soot deposits on the refractory surfaces and on surfaces at the periphery of the reaction zone. Without wishing to be bound by any specific theory, it is believed that the additional oxidizing gas shifts the oxidizer/fuel ratio away from the ratio at which soot begins to form, creating a lean combustion zone around the reaction zone. In addition, it is believed that soot condensation on surfaces at the periphery of the reaction zone is reduced due to the heat produced by the reaction of the additional oxidizer with the fuel gas or carbon deposits.

FIG. 3 shows a cross-sectional view of a combustion system capable of supplying additional oxidizing gas at the periphery of the top porous refractory element of the burner. The burner is shown inside a vacuum chamber. As shown in FIG. 3, the secondary oxidizing gas may be added to the system through a secondary oxidizer inlet (5) connected to a secondary oxidizer plenum (90) which introduces the oxidizing gas. The secondary oxidizing gas may be the same or different from the oxidizing gas that is used to form the flame. The oxidizing gas then flows to the periphery of the top porous refractory element (2*a*). The reaction zone (80) and non-sooting combustion zone (82) of the combustion system are also shown.

The burner of FIG. 3 also has a plurality (six) of porous refractory plates (2*a*-2*f*, top to bottom. In an exemplary embodiment, the upper plate shown in FIG. 3 (2*a*) has 45 pores per inch (ppi) and is 10.5" in diameter. The lower plates (2*e* and *f*) are 9.875" in diameter and have 30 ppi. All are 1" thick zirconia. Zirconia is preferred as the top plate (2*a*) for durability under the high heat loads, but plates below the surface (2*b*-*f*) may be made of alumina, cordierite, etc. without loss of function. Refractory plates having 45 ppi or higher are preferred for durability, but are somewhat more expensive than plates with lower ppi. The use of fewer, thicker plates generates a larger thermal gradient across the plates, promoting crack formation, while the use of more plates, but which are thinner, requires more seals, increasing the likelihood of a seal failing.

FIG. 3 also shows high temperature flexible seals, e.g. made from elastomeric materials (100) between a porous refractory element and the main plenum (1) and at the joints between porous refractory elements. Outer wraps of ceramic tape can be applied to cover the seals (100) and protect them from mechanical damage. Cooling coils (107) can also be provided to protect flexible seals near the burner outlet from thermal damage. A static mixer (7) and a metal frit (8) are used to mix gases in the plenum. Details of the static mixer are not shown. The plenum is surrounded by a fluid jacket (10) with coolant inlet (13) and coolant outlet (14).

The porous refractory element can be made of any refractory material that does not melt under its radiative heat load, including carbon and ceramics such as zirconia, alumina, and cordierite. Zirconia offers good stability, but is more expensive than alumina. Zirconia plates one to one and one-half inches thick and having about 30-50 pores per inch (70-90% porosity) with factory sealed edges have been used in the burners of the invention. The zirconia plates were obtained from Vesuvius Hi Tec, Alfred, New York. Zirconia grog (5 mm, Coors Tek Ceramics, Golden, Colo.) has also been used to form the refractory element surface of a burner. Cellular corderite blocks (Corning Inc., Corning, N.Y.) with channels between ⅛" and ¼" in diameter have also been used to form the refractory element of the burner. The downstream surface of the porous refractory element is designed to remain hot during operation. A hot surface does not need to be cooled to prevent its melting, sublimation, or decomposition under the heat load incident on it from the flame. A hot surface is also capable of withstanding temperatures in excess of about 1200° C.

The refractory element (e.g., 2*a*) can have any cross-sectional shape, including circular, hexagonal, or square. Preferably, the sides of the porous refractory elements are sealed to eliminate gas flow out the sides of the elements. In the case of a particulate refractory element, the particles are contained in a holder or hopper with a porous base (refractory or metal) below the particulates and above the plenum, and a side wall (or walls) which can be steel attached to the plenum or refractory, including the refractory that forms the insulated walls of the reaction zone. Tube bundles can be assembled in any shape, and cellular ceramics (which are only available with sealed walls) are also available in many shapes.

In a preferred embodiment, more than one reticulated porous refractory plate is used at the outlet of the burner plenum. If multiple refractory plates are used, they can have different compositions and/or porosity characteristics. The optimal number of porous refractory plates will depend on the plate material, porosity, and thickness, as well as the desired rate of gas flow through the reactor. The pore size and volume percentage of porosity of the refractory element can vary over a very wide range without significant impact on carbon nanomaterial production. For example, a relatively thin refractory plate with a relatively small pore size and porosity may be used to provide sufficient pressure drop for flow distribution while relatively thick plates with a relatively large pore size and porosity can be used as thermal shields. A thin metal frit with a relatively small pore size and porosity can also be used to provide sufficient pressure drop for flow distribution when used upstream of porous refractory elements with a low pressure drop (tube bundles or cellular ceramics, e.g.), so long as the refractories are still acting as thermal shields. However, the pore sizes should not be so small as to restrict the gas flows past where a flame can be sustained.

If the reactant gases are sufficiently mixed upstream of the burner refractory surface, the pores of the refractory element (e.g., the pores of the refractory plates, pores between refractory particles, tube diameters in tube bundles, or channel diameters in the cellular ceramics) are selected to be less than the quench distance for the flame to prevent ignition of the gases in the plenum. When the pore size exceeds the quench distance, a flame can exist within the refractory and can work its way back upstream until the upstream surface of the burner plate is hot enough to ignite the premixed gases. Since the quench distance is related to the fuel identity and pressure, the upper limit on pore size also varies with the fuel and pressure. Prevention of ignition in the plenum also depends on the thickness and thermal conductivity of the porous refractory. The porous refractory material(s) and thickness are chosen so that sufficient temperature gradient is present across the burner plate to prevent ignition in the plenum. Quench distance is also related to the temperature of the walls of the pores. Thus, as the refractory heats up, the flame may propagate back upstream of the downstream surface of the porous refractory. This is acceptable, providing that the upstream surface of the porous refractory is still cold enough to ensure that the gases in the plenum do not ignite, and that the porous refractory does not melt.

If the reactant gases are not sufficiently mixed to ignite upstream of the refractory surface, there is no chance of detonation in the plenum. Therefore, thermal transfer through the refractory is not critical to operation. If complete mixing of the gases is desired at the downstream face of the refractory, the high porosity constraint is that the pore size just barely achieves complete mixing of the reagents. The fuel and oxidizing gas may be added to the burner through separate inlets, added by concentric tubes, or manifolded to provide the desired level of mixing. The burner may also be operated when the fuel and oxidizing gases are incompletely mixed downstream of the burner refractory surface.

The fuel employed in the combustion methods of this invention is any hydrocarbon, fossil fuel, biomass fuel or products derived from them. In a preferred embodiment, the fuel contains polynuclear aromatic hydrocarbons (PAHs), as described in U.S. patent application Ser. No. 10/099,095, filed Mar. 15, 2002 and U.S. provisional application 60/316, 314, filed Aug. 30, 2001. The hot downstream surface of the invention enables the use of low vapor pressure high PAH-rich feedstocks such as coal tar distillates and petroleum solvent naphta distillates. The burner may be heated externally to prevent condensation of fuel within the burner upstream of the warm burner surface. For example, for toluene at 80 ml/min flowrate, condensation of toluene within the burner was prevented by flowing water heated to 75° C. within a fluid jacket in thermal contact with the burner walls. If the fuel requires heating to prevent condensation within the burner, the fuel supply line and burner inlet can also be heated to prevent condensation.

The oxiding gas (or oxidizer) is typically an oxygen-containing gas and is preferably oxygen. Air is also suitable, but the nitrogen in the oxidizing gas results in a lower carbon nanomaterial production rate per pumping rate in the apparatus. If the fuel requires heating to prevent condensation within the burner, the oxidizing gas supply line and burner inlet can also be heated to prevent condensation of the fuel when it mixes with the oxidizer. Additional oxidizing gas can be added to the flame around the circumference of the burner surface, preventing soot buildup on the porous refractory element and/or the parts of the combustion apparatus surrounding the burner flame. The oxidizing gas added to fuel in the burner and the secondary oxidizing gas provided into the combustion apparatus may be the same or different.

One or more diluent gases may be introduced into the burner or into the combustion apparatus in the peripheral oxidizer supply. Nitrogen is a preferred diluent gas.

One or more catalysts may be introduced into the burner. Iron, cobalt, and nickel are all known to catalyze the formation of carbon nanotubes from carbon and hydrocarbon vapors. Iron, nickel or cobalt can be introduced into the flame by subliming their cyclopentadienyl derivatives or by vaporizing their carbonyl complexes. Similarly, lanthanide atoms can be introduced into the reaction zone by subliming their triscyclopentadienyl derivatives into the hydrocarbon fuel feed. Lanthanides are known to form endohedral metallofullerenes when placed in a suitable fullerene-forming environment.

The equivalence ratio is one measure of the fuel/oxidizer ratio in the burner. The equivalence ratio is defined as $$(\text{fuel/oxidizer})_{actual}/(\text{fuel/oxidizer})_{stoichiometric}$$

where the fuel/oxidizer ratios are molar ratios. The fuel/oxidizer ratio is typically measured at the inlet to the burner and is adjusted by metering valves or similar devices prior to mixing the oxidizer and fuel. The actual fuel/oxidizer ratio in the combustion system may be locally different from the global ratio at different places within the combustion apparatus. The equivalence ratio is adjusted to maximize production of desired carbon nanomaterial products, e.g., the equivalence ratio may be adjusted to maximize the rate of production of soluble or extractable fullerenes. Varying the fuel/oxidizer ratio for a given fuel may allow control over the relative amounts of individual products generated in the combustion apparatus, i.e., it may permit adjustment of the $C_{60}/C_{70}$ ratio in condensible products. The optimum fuel/oxidizer ratio depends at least upon the type of fuel employed and the specific burner structure. For toluene, the preferred equivalence ratio is about 3. Since the burners of the invention can operate with a wide range of fuel/oxidizer ratios as well as a wide range of gas velocities, a greater range of parameters can be investigated to optimize the system for fullerene production. For burners of equal surface area, higher velocity indicates higher molar flow rates, and thus higher production rates.

Preferably, there is a thermally insulated region immediately downstream of the burner. The insulation provides for temperature maintenance in that region, referred to as the reaction zone. The longer and better insulated the reaction zone is, the more fullerenes will be formed. However, a greater portion of the fullerenes will be giant fullerenes, and the $C_{60}:C_{70}$ ratio will decrease. Thus, the length and degree of insulation in the reaction zone is related not only to hot gas velocity, but also to desired fullerene product distribution. Preferably, at least a millisecond residence time in the reaction zone is achieved, but residence times of tens of milliseconds will result in a greater overall fullerene yield. The reaction zone shown in FIG. 3 is 12" long. The inner 0.5" of insulation is zirconia, and the outer sections are alumina. Mixtures of silica and alumina on the lower temperature outer insulation shells are also acceptable.

Figure 4:
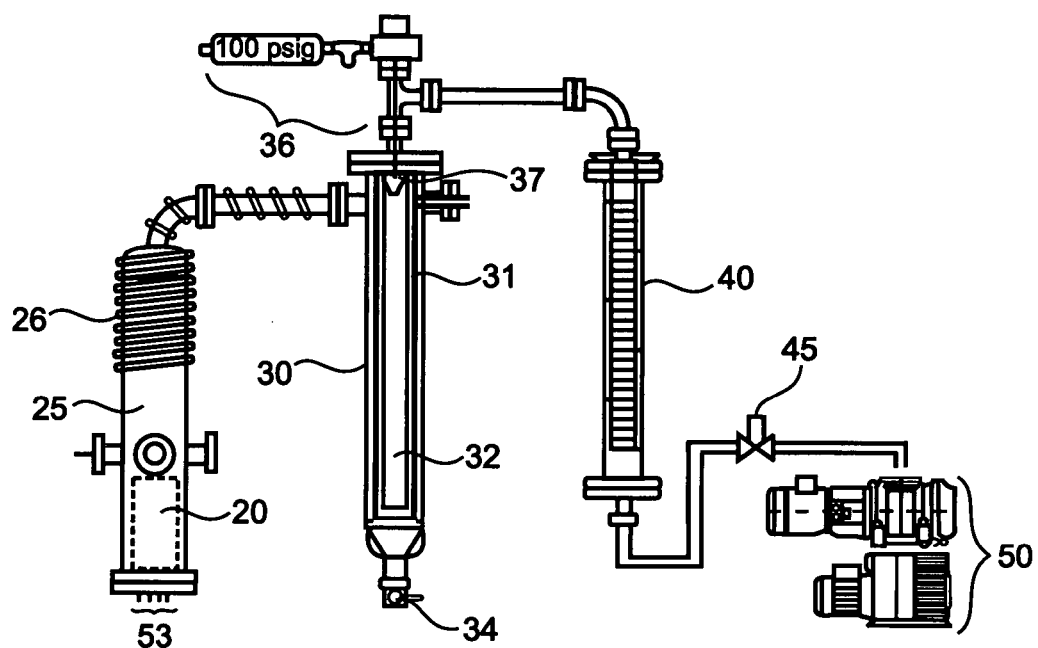
FIG. 4 shows one embodiment of the combustion apparatus of the invention.

In one embodiment, the invention provides a combustion apparatus for carbon nanomaterial production comprising: at least one burner having a porous refractory surface; an ignition source for said burner; a reduced pressure chamber downstream of said burner; a system for collecting the carbon nanomaterials produced, and a means for creating the reduced pressure. In the particular embodiment illustrated in FIG. 4, the burner (20) with the porous refractory element is enclosed within vacuum chamber (25). The vacuum chamber is surrounded by cooling coils (26) towards its outlet end. The vacuum in the chamber is supplied by vacuum pumps (50). In FIG. 4, the vacuum chamber (25) is connected to a collection unit (30) which incorporates a temperature controlled annulus (31) and a filter bag (32). The temperature controlled annulus, which is water cooled and a heat exchanger, cools the exhaust gases before they encounter the filter bag, but is not required. Alternatively, the gas may be cooled by a heat exchanger prior to entering the collection unit. However, any heat exchanger design should account for significant fouling by the soot and carbon nanomaterials. The collection chamber (30) has a ball valve (34) at its base which allows collection of captured soot and other products out of the bottom of the collection unit.

In a specific embodiment the collection apparatus comprises a method for in situ cleaning of the filter. One exemplary cleaning mechanism conveys a motive force and/or a gas flow or pulse to a filter to release captured products. In a specific preferred embodiment, the collection chamber is connected to a pulse jet system (36) via a Venturi nozzle (37). The pulse jet filter cleaning system is used to release soot from a filter bag (32), by conveying a motive force or gas pulse to the filter bag. In a more preferred embodiment jet pulses of gas are conveyed to the filter in a reverse flow configuration, such that the pulses applied for cleaning the filter flow from the downstream side of the filter to the upstream side of the filter. Products released from the collection device can be removed from the apparatus in various ways. Preferably products are collected and removed from the apparatus without significant disruption of the continuing synthesis of carbon nanomaterials.

Exemplary in situ filter cleaning devices, including reverse pulse jet-cleaned filter bag devices and methods for removal of collected products from a combustion apparatus are described in more detail in U.S. patent application, Ser. No. 10/098,828, filed Mar. 15, 2002 and U.S. provisional application Ser. No. 60/316,423, filed Aug. 30, 2001. Other means for collection and removal of combustion products from a combustion system are known in the art and can be readily adapted for use in the combustion apparatus of this invention. Other means for applying motive force and/or gas flow to a filter to clean the filter are known in the art and can be readily adapted for use in the combustion apparatus of this invention.

After passing through the product collection device, exhaust gases pass through a heat exchanger (40), a pressure controller throttle valve (45), and into vacuum pumps (50).

In a preferred embodiment, the combustion apparatus supplies additional oxidizer into the combustion apparatus adjacent to the inner walls of the combustion apparatus or reaction zone to decrease or prevent soot deposition at the walls. The oxidizing gas can be provided at or near the periphery at the downstream porous refractory surface of the burner as discussed above. However, the additional oxidizer may be provided by one or more gas inlets in the combustion apparatus, with the inlet or inlets positioned so that the oxidizing gas passes adjacent the walls of the combustion apparatus downstream of the burner. The secondary oxidizing gas does not have to flow through the burner structure or be a part of the burner structure.

The combustion apparatus may incorporate a single burner or multiple burners. A combustion apparatus with multiple burners can be made by setting several burners with circular burner plates together within a system housing. Alternatively, a different burner plate shape, such as hexagonal or square, can be selected to facilitate close packing of multiple burners in a combustion system.

The combustion apparatus also includes an ignition source. The ignition source for the burner can be any type of ignition source known in the art. In particular, the burner can be ignited using a spark. As one example, a Tesla coil can be used to form a spark between two wires. The ignition source can be placed within the reaction zone, or other igniter positions can be used. Other means for igniting a burner within a combustion system are well-known in the art and can be readily adapted without undue experimentation for use in the combustions apparatus of this invention.

The reduced pressure chamber allows sub-atmospheric pressures to be maintained downstream of the porous refractory surface of the burner. The reduced pressure chamber may completely enclose the burner. Pressures downstream of the burner surface are preferably between about 10 and 200 torr, more preferably between about 20 and 70 torr. Because the burner surface is porous and in fluid communication with the reduced pressure chamber, the pressure inside the burner is generally below atmospheric pressure. Since the mixing and flow distribution elements of the burner can cause pressure drops along the length of the burner, the pressure in the burner can vary with axial position along the burner.

While in the reduced pressure chamber, but after exiting the reaction zone, the combusted gas is allowed to radiatively cool to about 600° C. prior to collection. This is most simply done by allowing the gas to flow (and cool) for some distance in a non-insulated conduit (i.e., the walls of the reduced pressure chamber). The conduit could be cooled or a heat exchanger could be employed. Various means are known in the art for providing cooling of a flowing gas below a selected temperature and these various means can be readily adapted for use in the combustion apparatus of this invention.

The reduced pressure chamber can have gas inlets, sampling ports, methods for cooling the gas downstream of the burner, pressure and temperature sensing elements, and windows. The reduced pressure chamber can also have interior or exterior insulation, interior or exterior water jackets and/or interior or exterior cooling elements to aid in temperature control within the chamber or the burner (if the burner is contained within the chamber).

In the preferred embodiment, a heat exchanger (31) is placed in the gas stream upstream of the filtering device, such that product that deposits on the heat exchanger can still be recovered.

The system for collecting the carbon nanomaterials employs a collector such as a nonporous surface or a porous filter to collect the carbon nanomaterials. The carbon nanomaterials, including fullerenes and fullerenic soot, are collected as condensable products of combustion. Condensable products contain soot, fullerenic soot and fullerenes including products of combustion which may have rearranged or condensed with other combustion products in the heated zone. Condensable products may also contain polynuclear aromatic hydrocarbons, from the fuel or which are generated on combustion. As discussed briefly herein the presence of PAHs in fullerenes and fullerenic soot is not desirable and PAHs are preferably removed from isolated fullerenes or fullerenic soot. Condensables are any products of combustion (or remnants of hydrocarbon fuel) released at the burner which can be collected on a collector or on a filter. Condensables are distinguished from gaseous products, such as CO or $CO_2$, which may be released by the burner and from volatile components such as benzene, toluene, etc. A preferred system for carbon nanomaterial collection is pulse jet-cleaned filter bag device described in U.S. patent application Ser. No. 10/098,828, filed Mar. 15, 2002.

In the preferred embodiment of soot collection by filter bag, the pressure in the chamber would tend to increase as the bag is filled with soot. To maintain a constant pressure near the burner, a pressure-controlled throttle valve located between the pump and the bag is throttled in response to fluctuations in pressure in the chamber containing the burner. The valve is opened further as the bag becomes covered with soot.

Heat exchanger (40) cools the gas to at least the operating temperature of the pump(s) (50), greatly increasing the pumping efficiency. Placement of the heat exchanger after the collection unit minimizes fouling of the heat exchanger.

Typically, the chamber(s) of the apparatus are connected to one or more vacuum pumps. Any type of vacuum pump known in the art that is capable of attaining the specified pressure and gas flows may be used. The pump may be a rotary piston type, a liquid ring type, roots blower, etc. Alternatively, vacuum may be provided by steam ejectors.

As an average from 80 ml/min toluene feed, the apparatus shown in FIGS. 3 and 4 produces 200 g of solid carbon product per hour, 18% of which can be extracted by toluene and recovered as fullerenes. As much as 30% has been recovered. The water-cooled metal burners known in the art are able to produce soot with similar extractable fullerene content, but are only able to produce ca. 100 g of soot without major cleaning.

The invention also provides methods for synthesis of carbon nanomaterials including fullerenes and fullerenic soot employing sooting flame combustion in combination with the various apparatus and device elements described herein. In particular, the methods of this invention employ a burner with a porous refractory element to facilitate formation of and to stabilize the sooting flame and to improve the synthesis of carbon nanomaterials and provide a reaction zone at temperatures above about 1000° C. upstream of the sooting flame.

In specific embodiments, the invention provides a method for making carbon nanomaterials comprising the steps of:

providing a burner having at least one porous refractory element;

using the burner to establish a sooting flame in a chamber under conditions effective to produce macroscopic amounts of carbon nanomaterials, collecting the resulting condensable products of combustion, the condensables containing carbon nanomaterials; and recovering the carbon nanomaterials from the condensables.

In preferred embodiments, the combustion chamber is at a pressure less than atmospheric and the sooting flame is sustained by a hydrocarbon fuel and an oxidant;

The invention also provides a method for making carbon nanomaterials comprising:

providing an oxygen-containing gas stream and a hydrocarbon gas stream;

mixing the streams together;

distributing the mixed stream across at least one porous refractory element;

The methods of the invention may additionally comprise the step of providing a reaction zone downstream of the porous refractory plate at temperatures greater than 1000° C. This improvement can be provided by an insulating reaction zone and is suitable for all combustion apparatus and methods described herein.

The methods of the invention may also additionally comprise the step of adding additional oxidizer around the perimeter of the burner to prevent soot buildup on the porous refractory plate and any gas flow path insulation present. The additional oxidizer can also mitigate heat loss from the carbon nanomaterial forming flame to the surroundings. This improvement is suitable for use with any burner that has a downstream insulated section.

The invention relates to burners, combustion systems and methods for generating carbon nanomaterials employing combustion in sooting flames. The term "combustion" is used herein to refer to the exothermic reaction of a hydrocarbon or mixture of hydrocarbons with oxygen (or an other oxidizing gas) without limitation to any particular reactant stoichiometry to produce products in addition to $CO_2$ and $H_2O$. The term "burning" of hydrocarbon in oxygen or other oxidizing gas is intended to have the same meaning as combustion herein. Both terms are intended broadly to also encompass combustion initiated pyrolysis of hydrocarbons. Pyrolysis is the decomposition of a material, such as a hydrocarbon, by heat in the absence of oxygen and in combustion initiated pyrolysis heat for pyrolysis is generated, at least in part, by combustion of hydrocarbon. In general in combustion initiated pyrolysis, the combustion of one hydrocarbon or hydrocarbon mixture can be used to generate heat which pyrolyzes another hydrocarbon or hydrocarbon mixture.

Carbon nanomaterial collection systems have been discussed above. In a preferred embodiment, the methods of the invention collect condensables in the pulse jet-cleaned filter bag described in U.S. patent application Ser. No. 10/098, 828, filed Mar. 15, 2002.

In general, methods for recovering fullerenes from combustion formed condensables involve extraction in solvents such as toluene or xylene to recover lower molecular weight "solvent extractable fullerenes." In a preferred embodiment, the methods of recovering fullerenes from combustion soot using the methods described in concurrently filed U.S. application, Those of ordinary skill in the art will appreciate the existence of equivalents of device elements, method steps, and materials, all known functional equivalents of which are encompassed by the invention. All references cited herein are hereby incorporated by reference to the extent not inconsistent with the disclosure herewith.

We claim:

1. A combustion apparatus for carbon nanomaterial production comprising:
   - a vacuum chamber for maintaining a vacuum of 200 torr or less;
   - at least one burner in the vacuum chamber, a burner having one or more porous refractory elements forming the outlet of the burner;
   - a vacuum pump for maintaining a vacuum of 200 torr or less within the vacuum chamber; and
   - a system for collecting the carbon nanomaterials produced on combustion wherein the one or more refractory elements are ceramic elements.

2. The combustion apparatus of claim 1, additionally comprising a volatilizing chamber for volatilization of fuels prior to passage into the burner.

3. The combustion apparatus of claim 1 having multiple burners.

4. The combustion apparatus of claim 1 wherein the system for collecting carbon nanomaterials comprises a porous filter.

5. The combustion apparatus of claim 1 wherein the vacuum pump can maintain pressure in the reduced pressure chamber downstream of the burner between about 30 and about 50 torr.

6. The combustion apparatus of claim 1 wherein the vacuum pump can maintain pressure in the reduced pressure chamber downstream of the burner between about 10 and about 200 torr.

7. The combustion apparatus of claim 1 wherein at least one porous refractory ceramic element is a reticulated refractory ceramic plate.

8. The combustion apparatus of claim 1 wherein the one or more porous refractory elements comprise cellular ceramic.

9. The combustion apparatus of claim 1 wherein the one or more porous refractory elements comprise bundled refractory ceramic tubes.

10. The combustion apparatus of claim 1 wherein the one or more porous refractory elements comprise refractory ceramic particulates.

11. The combustion apparatus of claim 1 additionally comprising thermal insulation to create a reaction zone extending at least two inches downstream of the burner, wherein the temperature of the reaction zone is at least 1000° C.

12. The combustion apparatus of claim 1 wherein the one or more porous refractory elements comprise reticulated refractory ceramic.

13. The combustion apparatus of claim 12 wherein the reticulated refractory ceramic is zirconia.

14. The combustion apparatus of claim 2 wherein the burner comprises a plenum and wherein at least one gas mixing device is contained in the plenum.

15. The combustion apparatus of claim 2 wherein the volatilization chamber is a means for heating, pressurization or both of fuels.

16. The combustion apparatus of claim 1 wherein the at least one burner comprises a plurality of porous refractory ceramic plates including a top porous refractory ceramic plate.

17. The combustion apparatus of claim 1 wherein the one or more porous refractory ceramic elements of the burner are not cooled.

18. The combustion apparatus of claim 1 further comprising a heat exchanger upstream of the system for collecting carbon nanomaterials produced on combustion.

19. The combustion apparatus of claim 1 further comprising an inlet for introducing secondary oxidizer at the periphery of the burner.

20. The combustion apparatus of claim 1 further comprising a pressure controller valve between the reduced pressure chamber and the vacuum pump.

21. The combustion apparatus of claim 20 wherein the vacuum chamber is a chamber for maintaining a vacuum of 200 torr or less, and the vacuum pump is a vacuum pump for maintaining a vacuum of 200 torr or less within the vacuum chamber.

22. The combustion apparatus of claim 16 further comprising an inlet for introducing secondary oxidizer at the periphery of the top porous refractory ceramic plate.

23. The combustion apparatus of claim 1 wherein the burner comprises a plenum and wherein the apparatus further comprising a heater for heating the plenum of the burner.

24. The combustion apparatus of claim 2 wherein the burner comprises a plenum and wherein the apparatus further comprising a heater for heating the plenum of the burner.

25. The combustion apparatus of claim 2 further comprising an inlet for introducing secondary oxidizer at the periphery of the burner.

26. The combustion apparatus of claim 11 further comprising a non-insulated conduit between the thermally insulated reaction zone and the system for collecting carbon nanomaterials.

27. The combustion apparatus of claim 1 wherein the one or more refractory ceramic elements are zirconia elements.

28. The combustion apparatus of claim 1 wherein the burner comprises a plenum and wherein at least one gas mixing device is contained in the plenum.

* * * * *